United States Patent Office 2,699,078
Patented Jan. 11, 1955

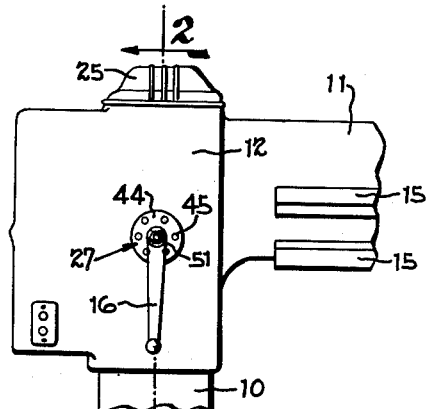
Fig.1
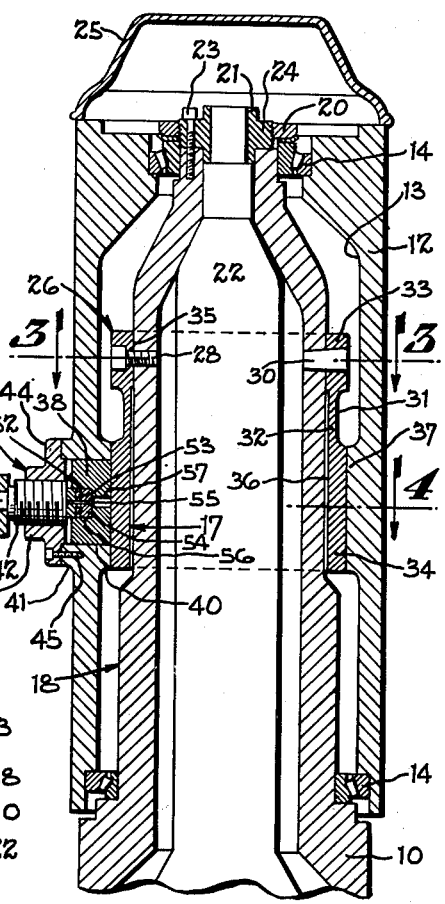
Fig.2
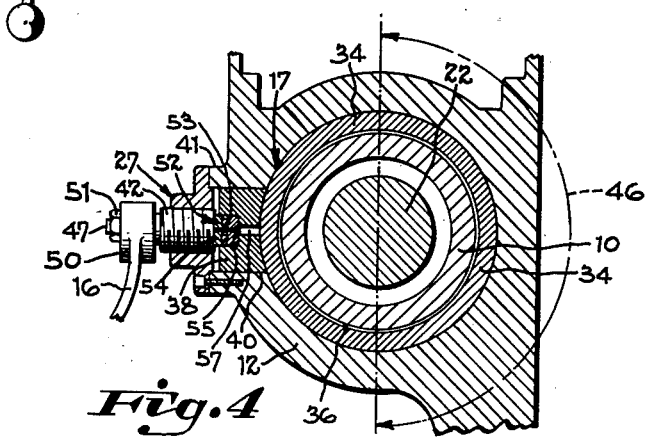
Fig.3
Fig.4
INVENTORS.
Robert N. Knosp.
BY Carl E. Linden.
Frank O. Wetzel.
Wood, Herron & Evans.
ATTORNEYS.

2,699,078

MACHINE TOOL CLAMPING MECHANISM

Robert N. Knosp, Ludlow, Ky., and Carl E. Linden, Cincinnati, and Frank O. Wetzel, Norwood, Ohio, assignors to The Fosdick Machine Tool Company, Cincinnati, Ohio, a corporation of Ohio Application December 23, 1953, Serial No. 400,082

5 Claims. (Cl. 77—28)

This invention relates to a clamping mechanism for machine tools generally and is directed in particular to an improved mechanism for clamping the shiftable arm of a radial drill to its supporting column.

The invention is disclosed in relation to a radial drill of a simplified type which includes a cylindrical column non-rotatably attached to a base, the column supporting a drill arm which includes a sleeve rotatably journalled upon the fixed column. The clamping mechanism is mounted within the arm sleeve and includes a hand operated lever journalled in the sleeve which is effective to clamp the arm firmly to the column in a selected radial position relative to the workpiece which may be supported upon a work table attached to the column beneath the arm.

It will be understood from the following description that the present clamping mechanism is not limited in its utility to the specific embodiment disclosed. By way of example, the mechanism may be utilized, without changing its principle of operation, as a column clamp for radial drills in which the column is mounted for rotation with respect to a base, with the arm keyed to the rotatable column. In this event, the clamping mechanism may be fixed relative to the column and utilized to clamp the column against rotation relative to the base after the column and its arm have been adjusted to a selected radial position.

One of the principal problems in establishing a clamping engagement between a cylindrical column and sleeve is the tendency exhibited by the two parts to rotate or creep slightly relative to one another as clamping pressure is applied. In the case of a radially shiftable arm, the radial displacement or creep of the sleeve, although relatively minute, is multiplied at the extended portion of the arm which carries the drill head; thus, the drill is shifted out of precise alignment with the hole center which is located upon the workpiece. The inching or creeping action evidently is due to an uneven application of clamping pressure upon the parts or to unequal motion of the clamping elements as they are brought into clamping engagement.

A clamping structure which eliminates this tendency is disclosed in the copending application of Robert N. Knosp et al., Serial No. 374,396, which was filed on August 14, 1953. The copending application discloses a laterally floating clamping ring disposed between the sleeve and column, the ring being loosely journalled upon the column and anchored against rotation relative to the sleeve so as to rotate with the sleeve relative to the column. Clamping pressure is applied to the ring by a screw which is anchored to the ring, the screw engaging a clamping shoe loosely confined in the ring and engageable against the periphery of the column. This structure provides a direct gripping force and eliminates the relative creep, such that the radial position of the sleeve and its arm is preserved as the clamping pressure is applied.

The primary object of the present invention has been to provide a clamping mechanism of simplified construction which utilizes generally the principle of applying the clamping pressure along a line radial to the axis of the column to prevent creeping and displacement of the arm during the clamping operation. A further object has been to eliminate clamping strains between the column and sleeve so as to maintain the sleeve bearings under normal loading and prevent relative column and arm deflection when the sleeve is clamped.

Essentially, the present clamping mechanism comprises a one-piece clamping ring disposed between the sleeve and column, the ring having an end portion rigidly anchored to the column and having a skirt portion which is shifted by an actuator along a line radial to the axis of the column into clamping engagement with the bore of the sleeve. Since the ring has a portion anchored to the column, the skirt, in effect, forms an integral part of the column and is rigid as to torque forces acting upon the skirt. The skirt is joined to the anchored end of the ring by a reduced wall section which is slightly resilient to forces acting laterally against the skirt portion. The outside diameter of the skirt is precision fitted within the inside diameter of the sleeve to provide a close running fit and an annular clearance is provided between the inside diameter of the skirt and outside diameter of the column to allow the skirt to deflect laterally upon being clamped.

Briefly therefore, the clamping ring forms a rigid part of the column in relation to torque forces, while at the same time, it is slightly resilient along lines radial to the axis of the column. Since the skirt portion is closely journalled within the sleeve to provide rotation of the sleeve about the skirt and column, only a slight lateral deflection under high pressure is required to rigidly clamp the skirt bearing surface against one side of the sleeve bore in which it is journalled.

The clamping pressure is applied to the skirt by a screw which is threaded through the wall of the sleeve on an axis radial to the center of the column, a clamping shoe being interposed between the end of the screw and outside diameter of the skirt. The screw includes a hand lever keyed to its outer end which is effective to rotate the screw in clamping and unclamping directions.

By reason of the fact that the clamping pressure acts upon the sleeve along lines radial to the axis of the column, the skirt has no tendency to create rotary creeping or deflection of the sleeve and its arm as the pressure is applied to it. Upon application of the clamping pressure, the clamping screw, which is anchored in the sleeve, forces the skirt under pressure against the bore of the sleeve at the side opposite the screw; therefore, the clamping forces are absorbed within the sleeve itself and are isolated from the column. Accordingly, the structure rigidly clamps the sleeve without overloading the sleeve bearings or springing the sleeve and its arm relative to the column. Upon being unclamped, the resilient portion of the ring springs the skirt back to its normal running fit in the sleeve bore to allow the sleeve to rotate freely upon its bearings.

In the present disclosure, the resilient portion of the sleeve is constituted by an annular groove machined in the outside diameter of the ring between the anchored end and the skirt. The groove delineates an annular wall section which is relatively thin in relation to the skirt wall section to provide the necessary resiliency. However, the thin wall section forms a continuous ring extending around the column and thus possesses a high degree of rigidity in resisting twisting or torque forces which may be applied against the arm.

Various other features and advantages of the invention will be more fully apparent to those skilled in the art from the following detailed description taken in conjunction with the drawings.

In the drawings:

Figure 1 is a fragmentary side view illustrating the upper portion of a radial drill incorporating the present clamping structure.

Figure 2 is an enlarged vertical section taken on line 2—2, Figure 1, illustrating the clamping mechanism within the sleeve of the drill arm.

Figure 3 is a horizontal sectional view taken on line 3—3, Figure 2, illustrating the structure which anchors the clamping ring to the drill column.

Figure 4 is a sectional view taken on line 4—4, Figure 2, illustrating the skirt portion of the clamping ring and the actuating mechanism for clamping the skirt against the bore of the arm sleeve.

Referring to Figure 1, the radial drill, which is selected to illustrate an embodiment of the present structure, consists of a perpendicular column 10 having an overhanging arm 11 rotatably journalled upon its upper end portion. The portion of the arm which is journalled upon the column includes a generally cylindrical housing or sleeve 12 forming an integral part of the arm and having a cylindrical internal bore 13 (Figures 2 and 3). The bore 13 is substantially larger than the diameter of the cylindrical column to provide an annular space between the column and sleeve to accommodate the clamping mechanism as described later. The arm sleeve is rotatably journalled upon the column by the tapered roller bearings 14—14 which are confined at the upper and lower end portions of the sleeve.

Beneath the overhanging arm 11, there may be provided a work-supporting table which is attached to the column, the table extending in cantilever fashion beneath the arm. In the alternative, the work may be mounted upon the base which sustains the column. The arm translatably supports the usual drill head which is slidably engaged upon the ways 15—15 of the arm for horizontal motion relative to the work-supporting table or base. The drill head includes the conventional power driven spindle projecting vertically toward the table and carrying a drill or similar rotating tool at its lower end. Following the conventional practice, the rotating spindle may be fed axially by power relative toward the workpiece. The work supporting table, base, drill head and related parts have been omitted from the drawings since they form no part of the present invention.

In operating the machine, the drill head is shifted along the arm and the arm is swung radially about the column in a horizontal plane to center the drill with the hole centers of the work. After the drill head and drill are located, the arm is clamped rigidly in its radial position by manually shifting the clamping lever 16 to its clamping position, the lever being journalled in the sleeve at the operator's side of the machine. Shifting the arm to clamping position actuates the clamping mechanism, indicated generally at 17 (Figure 2), which locks the arm sleeve to the column. After completing the drilling operation, the drill spindle is retracted and the clamping lever 16 is shifted to unclamped position to allow the arm to be adjusted for the next hole.

As shown in Figure 2, the upper end portion of the column 10 is counterturned to provide the reduced diameters, indicated generally at 18, upon which arm sleeve 12 is journalled. The bearings 14—14 are of the tapered radial type arranged to provide axial adjustment to compensate for wear. For this purpose, an adjustment nut 20 engages the inner race of the upper bearing 14, the nut being threaded upon a collar 21 which is mounted upon the upper counterturned end of the internal post 22 extending through the hollow column. The collar is locked against rotation by a cap screw 23 passing through the flange 24 of the collar and threaded into the end of the column. A closure cap 25 is mounted upon the upper end of the sleeve to protect the bearings and clamping mechanism against dirt and dust.

Described with reference to Figure 2, the clamping mechanism consists essentially of a cylindrical clamping ring 26 encircling the column, the ring having an upper end secured rigidly to the column and a lower skirt portion capable of being sprung laterally into pressure engagement against the internal bore of the arm sleeve. The clamping pressure is developed by an actuating mechanism, indicated generally at 27, which is actuated by the clamping lever 16. It will here be noted that the clamping ring is fixed rigidly to the column in stationary position, while the arm sleeve is rotatable about the ring when the mechanism is in unclamped condition.

As shown in Figure 3, the clamping cylinder is secured to the column by means of the cap screws 28 and is further keyed by the tapered drive pins 30 which take up any minute looseness which may otherwise exist between the ring and column. The upper part of the clamping ring, in effect forms an integral part of the column; therefore, the ring is rigid as to torque forces acting upon it. On the other hand, the ring is free to be sprung laterally, at least to a limited extent, relative to the column in response to operation of the actuating mechanism 27.

The actuating mechanism 27 springs the skirt portion of the sleeve along lines radial to the center of the column; therefore there are no forces developed which react tangentially and which tend to rotate the sleeve. Moreover, after the ring is forced into engagement with the bore of the arm sleeve, there is no looseness existing between the sleeve and column by virtue of the rigidity of the ring in resisting torque forces. Assuming therefore, that sufficient clamping force is applied to the skirt portion, the sleeve and its arm are locked rigidly to the column and the arm cannot be deflected from its adjusted position even if a considerable force is exerted upon the extended end of the arm.

It will be observed that the actuating mechanism 27 is mounted at one side of the sleeve and that the diametrically opposite portion of the cylinder is forced against the bore of the sleeve, thus confining the clamping forces within the arm sleeve and clamping ring. Since the cylinder is free to spring laterally, practically no reacting force is developed between the column and sleeve, either radially or axially. Therefore, the roller bearings 14—14 remain at normal loading whether the arm is clamped or unclamped and there is no tendency to spring the arm sleeve relative to the column under clamping pressure.

Referring to Figure 2, it will be noted that the clamping ring is provided with a groove or necked portion 31 near its upper end which provides a thin metal section indicated at 32 intervening between the anchored head 33 of the ring and its skirt portion 34. The thin metal connecting section imparts sufficient resiliency to allow the skirt to be sprung laterally without the application of undue force. As indicated at 35, the head 33 fits snugly around the column, while a slight clearance, indicated at 36, exists between the skirt and column to allow the skirt to be sprung laterally relative to the column.

The outside diameter of the skirt is machined to provided a snug running fit with the inside diameter of an internal hub 37 which rises outwardly from the internal bore 13 of the arm sleeve. The bearing surfaces of the hub and skirt are machined to a fine finish and the diameters of the two parts are held within close limits to provide the snug running fit. The close fit naturally provides a clamping engagement of the bearing surfaces upon relatively slight lateral deflection of the sleeve. The bearing surface of skirt 34 and the counterturned portions of the column are machined to their final dimensions with the ring assembled upon the column, such that the sleeve and column bearing surfaces are truly concentric with one another.

The clamping pressure is applied to the skirt 34 by a clamp shoe 38 having an arcuate clamping face seated against the bearing surface of the skirt. The shoe and its associated parts are substantially identical to the structure disclosed in the aforesaid copending application; however, in the present structure, the actuating mechanism is attached directly to the arm sleeve instead of being mounted on the clamping ring as in the prior structure. The shoe 38 preferably is cylindrical and is slidably confined in a bore 40 formed in the wall of the sleeve 12. Since the shoe and its bore have a substantial length, the wall of the sleeve is provided with a cylindrical boss 41 surrounding bore 40. Clamping pressure is applied to the outer end of the clamping shoe by a screw 42 which is rotated by the clamping lever 16 previously noted.

The screw 42 is threaded through a cap 43 which includes a flange 44 attached by screws 45 to the boss 41. As best shown in Figure 4, the common axis of the screw and clamp shoe is radial to the center of the column. Thus, upon rotation of the screw in clamping direction, the shoe moves inwardly along the radial axis a sufficient distance to force the skirt into pressure engagement against the bearing surface of hub 37. The clamping forces are thus confined within the sleeve and, as indicated by the arrow 46 in Figure 4, the skirt provides a clamping interface extending for approximately one half the circumference of the hub and skirt.

The outer end of screw 42 includes a stub shaft 47 having a serrated end portion 48 mating with a corresponding bore formed in the hub 50 of the clamping lever 16. The hub is locked upon the stub shaft by a nut 51 threaded upon the outer end portion of the shaft. The serrated connection between the shaft and hub keys the lever to the shaft at the selected radial clamping angle and allows the lever to be repositioned in the event that the clamping range changes due to wearing of the parts after prolonged service.

In order to reduce frictional resistance, an anti-friction thrust bearing indicated generally at 52 is interposed between the adjoining ends of the screw and clamping shoe. The thrust bearing comprises a series of balls 53 which are confined between the races 54—54. For assembly purposes, the races are rotatably connected together by a rivet 55 extending axially through them. The thrust bearing is confined in a bore 56 machined in the outer end of the clamp shoe. The shoe also includes a hole 57 drilled axially through the shoe to accommodate a drive pin for dislodging the thrust bearing if necessary.

From the foregoing, it will be observed that the clamping mechanism provides direct engagement of the ring and sleeve, with the clamping force acting along lines radial to the center of the column. As a consequence, the arm sleeve is locked without developing any radial forces tending to inch or rotate the sleeve from its adjusted position during application of the clamping force. Since the ring is stationary and the sleeve is rotatable, the clamping area of the ring changes with the various radial positions of the arm; therefore the wear is not concentrated upon any particular ring area.

The forces developed in the clamping operation react within the sleeve itself with practically no strain imposed upon the sleeve bearings or reacting between the sleeve and column. This also preserves the accuracy of the arm adjustment, since it eliminates relative springing of the sleeve and column under the application of clamping pressure.

Having described our invention we claim:

1. In a machine tool having a cylindrical column and a machine element including a sleeve movably embracing the column, the sleeve having an internal bore which is greater than the diameter of the column providing an annular space between the sleeve and column; a clamping mechanism for clamping the sleeve and column in fixed position relative to one another comprising, a cylindrical clamping ring encircling the column and disposed in the annular space between the sleeve and column, means anchoring an end portion of the clamping ring to the column, said clamping ring having a cylindrical skirt extending from the said anchored end portion, the outside diameter of the skirt being journalled in the internal bore of the sleeve for relative movement of the skirt and sleeve, and actuating means anchored on the said sleeve and having a portion engaging said skirt, said actuating means effective to apply pressure to said skirt along a line generally radial to the center of the column, thereby to spring the skirt laterally and to force the outside diameter thereof into clamping engagement with the bore of the sleeve to lock the skirt and sleeve against relative movement.

2. In a machine tool having a cylindrical column and a machine element including a sleeve movably embracing the column, the sleeve having an internal bore which is greater than the diameter of the column providing an annular space between the sleeve and column; a clamping mechanism for clamping the sleeve and column in fixed position relative to one another comprising, a cylindrical clamping ring encircling the column and disposed in the annular space between the sleeve and column, means anchoring an end portion of the clamping ring to the column, said clamping ring having a cylindrical skirt extending from the said anchored end portion, the clamping ring having a laterally resilient portion intervening between the skirt and the anchored end portion of the ring, said skirt having an inside diameter larger than the outside diameter of the column, the outside diameter of the skirt being journalled in the internal bore of the sleeve for relative movement of the skirt and sleeve, and actuating means anchored on the said sleeve and having a portion engaging the outside diameter of said skirt portion, said actuating means effective to apply pressure to said skirt along a line generally radial to the center of the column, thereby to spring the skirt laterally and to force the outside diameter thereof into clamping engagement with the bore of the sleeve to lock the skirt and sleeve against relative movement.

3. In a machine tool having a cylindrical column and an arm including a sleeve embracing the column, the sleeve having bearings rotatably journalling the sleeve upon the column, said sleeve having an inside diameter providing an annular space between the sleeve and column; a clamping mechanism for locking the sleeve against rotation relative to the column comprising, a clamping ring encircling the column and disposed in said annular space, means anchoring an end portion of the ring to the column, the clamping ring having a cylindrical skirt extending from the anchored portion thereof, the clamping ring having a laterally resilient portion intervening between the skirt and the anchored end portion of the ring, said skirt having an inside diameter which is greater than the outside diameter of the column, the skirt having an outside diameter rotatably journalled within the inside diameter of the sleeve, and actuating means mounted on the sleeve and having a portion engaging the outside diameter of the skirt, said actuating means including an element movable along a line radial to the center of the column and engaging the outside diameter of the skirt, the actuating means effective to apply pressure to the skirt along said radial line, thereby to spring the skirt laterally and to force the outside diameter thereof into clamping engagement with the inside diameter of the sleeve to lock the sleeve against rotation relative to the column with the clamping forces reacting within the sleeve and isolated from the column.

4. In a machine tool having a cylindrical column and a machine element including a sleeve movably embracing the column and having an inside diameter providing an annular space between the sleeve and column; a clamping mechanism for locking the sleeve and column in fixed position relative to one another comprising, a clamping ring encircling the column and disposed in the annular space between the sleeve and column, means anchoring an end portion of the clamping ring to the column, the ring having a skirt on an end opposite to said anchored portion, the ring having an annular groove formed therein between the anchored end portion and skirt, said annular groove providing a resilient wall section which is substantially thinner than the wall section of the skirt and allowing the skirt to be sprung laterally, the skirt having an inside diameter greater than the outside diameter of the column, the skirt having an outside diameter movably journalled in the inside diameter of the sleeve, the sleeve having an opening through one wall thereof, a clamping shoe slidably mounted in said opening and having an inner end engaging the outside diameter of the skirt, said shoe being movable along a line radial to the center of the column, and actuating means anchored upon the sleeve and engaging the clamping shoe, the shoe being effective to spring the skirt laterally and to force the outside diameter of the skirt into clamping engagement against the inside diameter of the sleeve to clamp the sleeve and column against relative movement.

5. In a machine tool having a cylindrical column and an arm including a sleeve embracing the column, the sleeve having bearings rotatably journalling the sleeve upon the column, said sleeve having an inside diameter providing an annular space between the sleeve and column; a clamping mechanism for locking the sleeve against rotation relative to the column comprising, a cylindrical clamping ring encircling the column and disposed in the annular space between the sleeve and column, means anchoring an end portion of the ring to the column, said ring having a cylindrical skirt extending from the anchored portion thereof, the ring having an annular groove formed therein between the skirt and anchored portion, the groove providing a laterally resilient connecting wall section between the skirt and anchored portion of the ring, said skirt having an inside diameter which is greater than the outside diameter of the column, the skirt having an outside diameter rotatably journalled within the inside diameter of the sleeve, the sleeve having a bore through the wall thereof open to the outside diameter of the skirt, a clamping shoe slidably mounted in said bore and movable along an axis radial to the center of the column, a collar disposed on the axis of said bore and attached to the sleeve, an actuating screw threaded through said collar and engaging the clamping shoe, and means attached to the screw for rotating the same to clamping and unclamping positions, the shoe being effective to spring the skirt laterally and to force the outside diameter thereof into clamping engagement with the inside diameter of the sleeve to lock the sleeve relative to the skirt with the clamping force reacting within the sleeve and isolated from the bearings which journal the sleeve upon the column.

References Cited in the file of this patent

UNITED STATES PATENTS

Re. 14,263    Sears _____ Feb. 20, 1917

FOREIGN PATENTS 485,902    Great Britain _____ May 26, 1938